United States Patent Office 3,444,670
Patented May 20, 1969

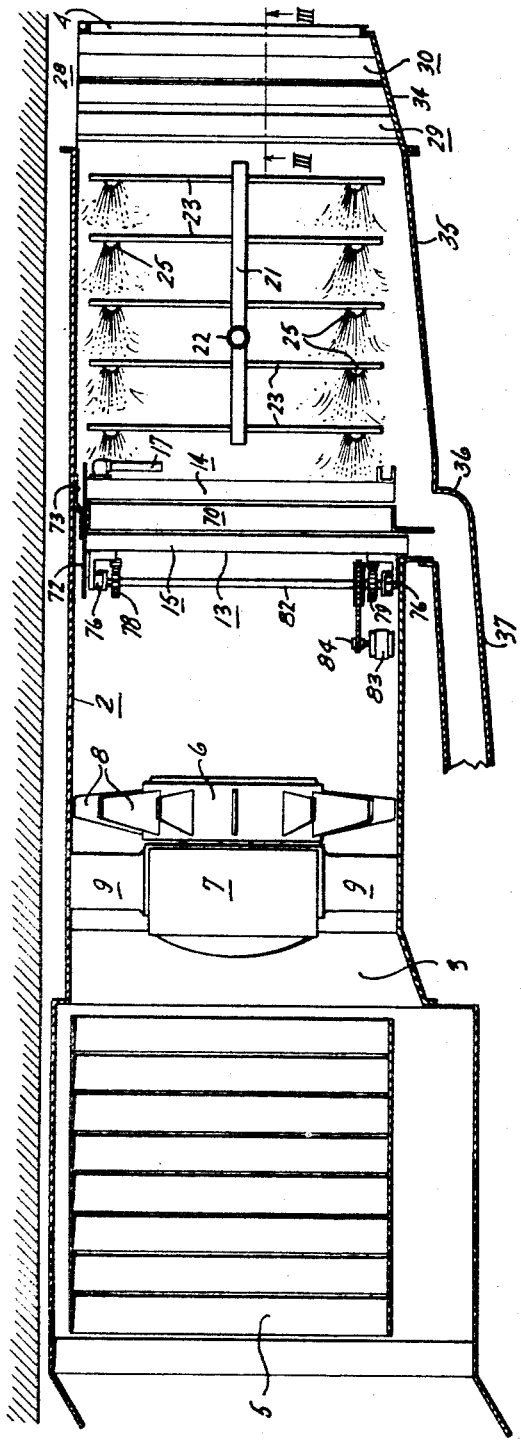
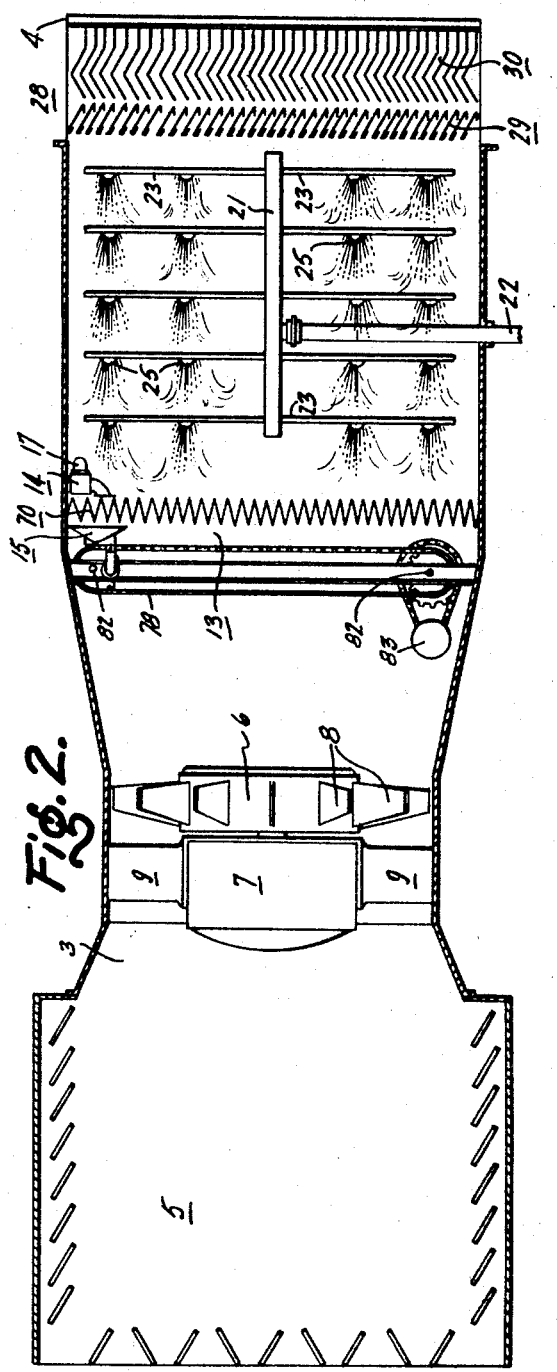

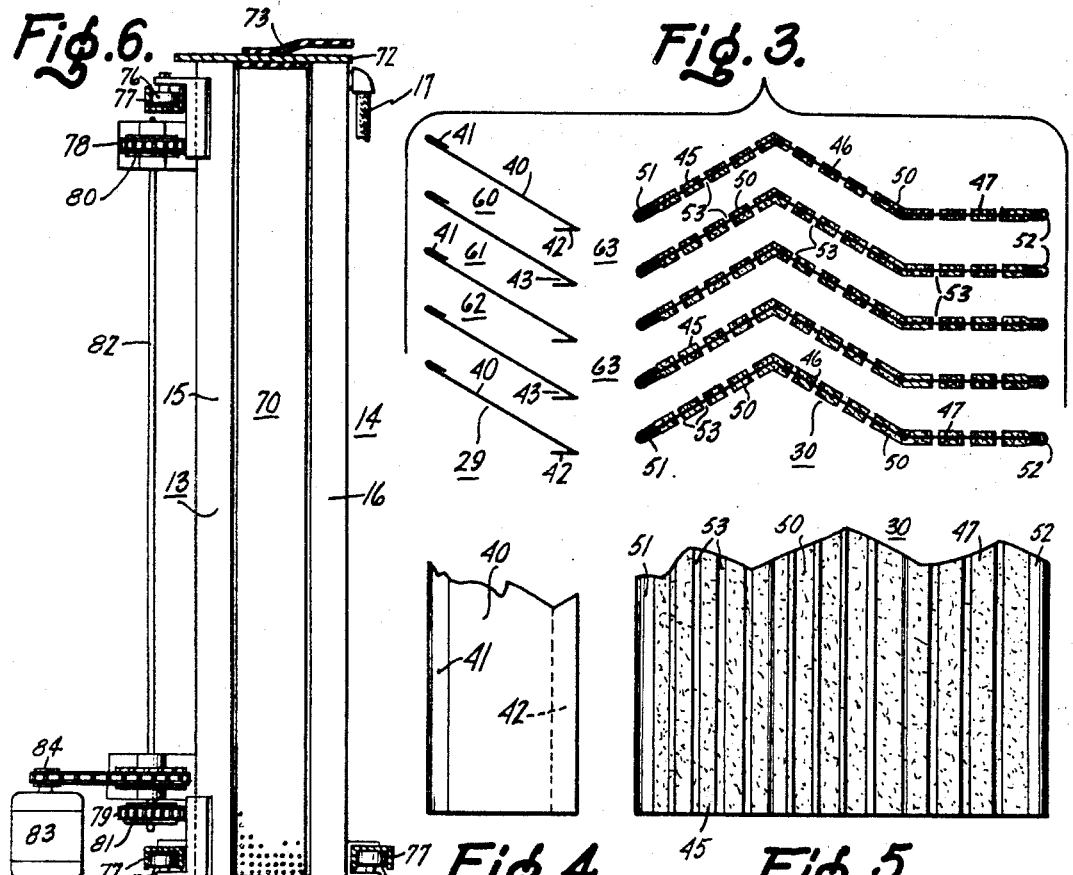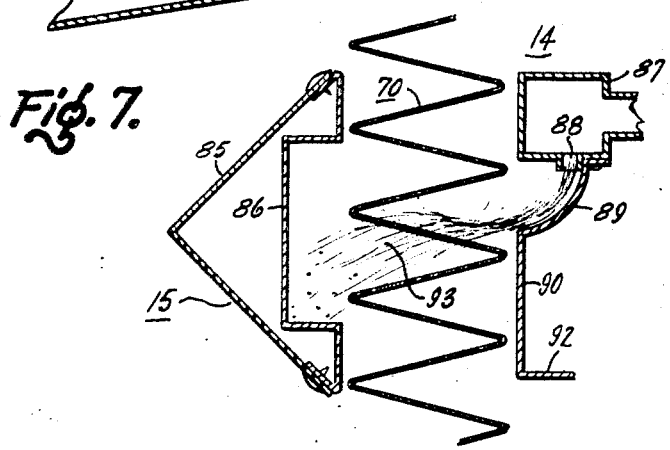

3,444,670
APPARATUS FOR TREATING GAS
Ernest C. Hungate, Rte. 5, P.O. Box 88,
Greensboro, N.C. 27402
Filed June 21, 1965, Ser. No. 465,579
Int. Cl. B01d 47/06
U.S. Cl. 55—257          3 Claims This invention relates to an apparatus for treating gas and more particularly to an apparatus for treating gas by placing it in intimate contact with a liquid. More specifically, the present invention is directed to an apparatus for treating air with a liquid, such as water, said apparatus being of the type generally used in air conditioning and air washing systems. In these systems an air stream is passed through a housing into direct contact with water by discharging the water into the air stream as it moves through the apparatus.

Heretofore, apparatus for treating air with water as generally used in industrial applications have been severely restricted in operating velocities due to the configuration of the eliminators employed in the apparatus. Eliminators are normally used to remove entrained water particles from the air stream before the air stream is discharged from the apparatus. These eliminators usually consist of a plurality of stationary blades having a general saw-tooth cross-section which define zig-zag paths through the eliminators. The path configuration is intended to result in the impingement of the liquid particles on the blades where the liquid is collected and drained. Generally, these eliminators are effective up to a predetermined velocity at which point the liquid droplets in the air stream tend to pass through the eliminator construction. One of the reasons for this passage of liquid through the eliminator construction is the splattering or impinging of the water droplets on the blade surfaces in such a manner that the liquid passes back into the air stream and continues with the air stream out of the apparatus.

In order to ameliorate the situation the tendency has been to extend the zig-zag path by adding more stages so that eventually all the water droplets are removed. Unfortunately, when this expedient is utilized the pressure drop through the unit is increased thereby requiring larger fans to be used to pump the air. Naturally, the acceptable pressure drop through the eliminator and the consequent fan size have an upper limit which is easily reached and as a result this approach is not truly a solution but is only an expedient.

Air washers which employ eliminators normally have a further problem in that the air passing through the unit is not filtered so that the particles in the air stream when they are moistened may tend to harmfully affect the eliminator operation. For example, in textile mills recirculating air is usually utilized and this air contains a substantial lint content. The wet lint entering the eliminator structure will eventually build up a layer of material on the eliminator blades and will eventually require removal of the blades for cleaning.

To intercept lint and other foreign particles in a gas or air stream it is therefore desirable to utilize a filter. However, a filter has the undesirable characteric of not only being subjected to lint buildup which will require its frequent cleaning but also raises the problem of another source of pressure drop in the unit in addition to that normally experienced in the eliminator construction.

The chief object of the present invention is to provide an improved air washing apparatus.

An object of the present invention is to provide an improved eliminator structure for use in a gas-treating apparatus.

Another object of the present invention is to provide an improved filter for a gas stream.

A still further object of the invention is to provide an improved eliminator construction capable of operating at high gas velocities while effectively removing liquid particles from the gas stream.

A still further object of the invention is to provide an improved self-cleaning air filter.

These and other objects of my invention will be more readily perceived from the following description.

The present invention is directed to an apparatus for treating a gas stream with a liquid, such as an air washer which treats an air stream with water. The apparatus includes a housing having a passage therein with an inlet and an outlet and may include fan means for passing the air stream through the passage. A filter may be located in said passage for removing particles from the gas stream and this filter may include cleaning means for the filter. The cleaning means comprises a construction defining a movable chamber which encloses a portion of the filter. A liquid stream may be discharged into the portion of the filter in the chamber in a direction upstream to the gas passing through the apparatus. The liquid stream removes foreign particles from the filter without harmfully affecting the operation of the filter and does not impede the air stream passing through the apparatus. The apparatus further comprises an eliminator for removing entrained particles from the gas stream and may include a plurality of wall members upon which the gas stream impinges. At least a portion of said wall members is fabricated of a resilient and porous material.

The attached drawings illustrate preferred embodiments in the invention in which:

FIGURE 1 is a sectional view in elevation of an apparatus emplyoing the invention;

FIGURE 2 is a sectional view in plan of the apparatus shown in FIG. 1;

FIGURE 3 is a sectional view of the eliminator construction taken along the line III—III in FIG. 1;

FIGURES 4 and 5 are fragmentary views in elevation of the blades in FIG. 3;

FIGURE 6 is an enlarged fragmentary view in elevation of the filter in FIG. 1; and FIGURE 7 is an enlarged fragmentary view in plan of the filter cleaning means.

Referring to the drawings there is shown in FIGURE 1 apparatus embodying the present invention for treating an air or a gas stream. This apparatus includes a housing 2 having an inlet 3 and an outlet 4. The inlet 3 and the outlet 4 are connected by a passage defined by the housing. In an air washer as used in a textile mill the inlet 3 is usually connected to a mixing chamber 5. Usually this mixing chamber 5 has adjusting means therein to predetermine the amount of outside air and return air which are to be introduced into the air washer.

Located downstream from the inlet 3 of the air washer is a suitable air moving means such as a fan 6 which is driven by a fan motor 7. Fan 6 includes a plurality of radially extending blades 8. However, it will be appreciated that other fan means may be utilized to practice the invention. In this particular embodiment fan 6 is mounted in the passage of the air washer by means of struts 9.

Downstream from fan 6 may be located a suitable filter area wherein is mounted a vertically extending filter 13. Associated with this filter 13 may be a filter washing device 14 which in the present embodiment comprises a shield 15 and a spray 16, said spray being connected to a flexible water line 17. The details and the mode of operation of the filter and the filter washing device will be more fully described hereinafter.

Immediately adjacent the filter area and located downstream therefrom is a spray chamber which includes in this embodiment an axially extending header 21 connected by means of a supply line 22 to a source of liquid. In an air washer this liquid may be water having a predetermined temperature. Radial arms 23 extend from the header 21 having suitable spray nozzles 25 at the ends thereof whose function is to spray liquid particles in to the air stream to treat the air in a manner to be more fully described hereinafter.

On the downstream side of the spray chamber portion of the air washer is located an eliminator structure 28 which comprises two sets of vertically extending blades. Blades 29 constitute the preliminary eliminator structure which removes coarse particles from the air stream while downstream therefrom blades 30 remove the fine particles in the air stream. The construction and operation of the eliminator structure will be more fully described hereinafter.

Intercepted liquid particles are drained down the slanted bottom portion 34 located underneath the eliminator blades 29 and 30. This liquid then passes into the drain trough 35 which slants toward and directs liquid into sump 36 which lies beneath the filter construction 13. Liquid collected in this sump is passed from the apparatus through drain 37 to suitable conditioning and filtering means (not shown).

FIGURE 3 is a fragmentary sectional view taken through the lines III—III in FIGURE 1 showing the coarse eliminator blades 29 and the fine eliminator blades 30. The coarse and fine designations are utilized to indicate the character of the particles being intercepted by these portions of the eliminator construction.

The coarse blades 29 comprise a plurality of parallel planar members 40 having a leading tab 41 and having a trailing hook 42 forming channel 43. The parallel planar members 40 are angularly disposed with respect to the air flow to cause impingement of the air stream with any particles therein against the planar surfaces to intercept the liquid particles and to collect the liquid particles on the surface and in the channel 43. The passages between the planar member 40 in FIGURE 3 are identified as 60, 61 and 62.

In FIGURE 3 the fine eliminator blades comprise a plurality of members having a leading planar member 45, a second planar member 46 formed angularly with respect to the first member and a trailing member 47 lying substantially parallel to the direction of air flow. In this particular embodiment the fine blades 30 are covered with an urethane foam 50. Also attached to the blades are clips 51 and 52 which constitute the leading and trailing portions of each individual blade and which protect the foam. This urethane foam has the quality of being both a porous material having a large number of small openings therein which also define therein a plurality of passages. In addition, the material has a resilient quality. Another characteristic of this foam coating is the location therein of spaced grooves 53 which are closely spaced to form a plurality of channels extending preferably the entire length of the eliminator blade structure in a general vertical direction. The mode of operation and the function of the foam with the separating grooves will be more fully described hereinafter. FIGURES 4 and 5 are fragmentary views in elevation of the blades in FIGURE 3.

FIGURE 6 is a fragmentary sectional view taken in elevation of the filter construction shown in FIGURE 1. FIGURE 7 is an enlarged sectional view taken in plan of the filter washing device 14 shown in FIGURE 2. Referring to FIGURES 6 and 7, filter construction 13 includes a filter washing device 14 which includes an upstream located shield 15 and a downstream located shield having a spraying device 16. In FIGURE 7 it can be seen that the filter comprises a zig-zag cross-section plate 70 having a large number of perforations. The zig-zag plate is fabricated of stainless steel and has openings therein which constitute approximately 45% of the area of the plate. The purpose of the zig-zag configuration is to increase the available filter area in the air washer. It will be appreciated that other filter element configurations may be utilized to practice this invention.

Referring to FIGURE 1 and also to FIGURE 6 in particular, it can be seen that the filter washing device 14 comprises, as previously mentioned, the shield 15 and the spraying device 16. These elements are connected by the member 72 shown in FIGURE 6 to form a unitary arrangement. From FIGURES 2 and 7 it is noted that the washing device is intended to wash only a portion of the filter at a particular time so that continued operation of the air washer is permitted. It is therefore necessary to provide means for moving the filter washing device in a horizontal direction from one side of the air washer to the other.

To perform such movement of the air washing device which includes the shield 15 and the washing device 16 connected by member 72, there are mounted at fixed points on these various elements a plurality of rollers 76 which ride on horizontally oriented tracks 77 extending across the passage formed in the air washer. It will be appreciated that these rollers may take various shapes. Tapered rollers may be used so that the rollers will not only support the weight of the device but also provide load bearing functions to sustain the thrust of the air passing through the unit. In order to be assured that a minimum amount of air will bypass the filter suitable sealing members, such as shown at 73 may be provided for sealing the spaces between the filter and the casing of the air washer.

Means are provided in this embodiment to move the filter washing or cleaning device horizontally in a desired continuous or intermittent manner so that the previously mentioned portions of the filter are washed. In this particular embodiment two chain belts 78 and 79 are provided which are fastened as shown in FIGURE 2 to the shield 15. By this means movement of the chains will result in the movement of the shield 15 and the washing device 16 which is associated therewith. These chains are mounted on suitable sprockets 80 and 81 shown in FIGURE 6. In this particular embodiment two sets of sprockets 80 and 81 are provided adjacent the vertical walls of the washer. These sprockets are mounted on shafts 82 which are journaled in stationary bearings. One of the shafts 82 (FIGURE 2) is connected to motor 83 by means of the chain of sprocket drive 84 (FIGURE 6). The motor 83 is a reversible motor in this embodiment which may be associated with suitable limit switches (not shown) which causes the motor to drive the chain and sprocket arrangement in such a manner so that the shield 15 and attachments thereto will pass from one side of the air washer to the other.

In FIGURE 7 there is shown a preferred embodiment of the air washing device wherein the shield 15 comprises an air easement portion 85 having a general V-shape and on the downstream side this air deflector is formed to provide a trough 86 which collects liquid and particles being removed from the perforated plate 70.

For the purpose of passing a spray through the filter a vertically oriented header 87 is provided connected by a flexible hose to a source of cleaning liquid such as water. This water may then be discharged through a series of horizontal circular nozzles 88 and is urged into contact with the vetrically extending arcuate deflector plate 89 which converts, by centrifugal force, the various discharge jets into a vertically extended sheet of water impinging this water against the plate 70 causing particles located in the openings in the filter to be dislodged and passed into trough 86.

To define a suitable chamber 93, where this washing of the plate 70 takes place, which is isolated from the air stream passing through the air washer, suitable flange 90 may be provided. Flange 90 and 92 with the deflector plate 89, header 87 and shield 15 define chamber 93 in which this cleaning process is performed.

Considering the operation of the apparatus shown in FIGURES 1 and 2 air is initially drawn into the mixing chamber 5. This air may, in the case of an air washer, be recirculated air and outside air which after being proportioned in the mixing chamber 5 is introduced into the opening 3 of the air washer. This air is drawn into the air washer by the fan 6 which propels the air inwardly toward the filter 13. At this filter it is intended that particles such as lint be intercepted and removed from the air stream passing through the air washer. This interception is performed by the perforated plate 70 illustrated in FIGURES 6 and 7. While air flows through filter 13, portions of plate 70 are being cleaned by being placed in the chamber defined previously as chamber 93 wherein liquid is passed through the header 87 shown in FIGURE 7. This liquid is discharged in a stream through a series of nozzles 88 and against the deflecting plate 89 so that a vertically oriented stream of liquid is passed in an upstream direction to the flow of air through the filter. This liquid is passed into the openings in the plate 70 to dislodge foreign particles and lint therein and to flush the surfaces of the plate 70. A substantial portion of the liquid flows into the trough 86 which defines a portion of chamber 93. It will be noted that this chamber 93 is protected from air flow by the close proximity of the angularly disposed walls of the deflector 85 so that while the washing process is carried out in chamber 93 air is permitted to bypass this chamber. During this washing the remaining portion of this plate 70 is performing its normal filtering action. After a period of time each portion of plate 70 will be cleaned because of the rotation of the previously described chain and sprocket drive in response to the motor 83 causes the cleaning device 14 to be passed across the filter. The direction of the cleaning device is reversed by the action of suitable switches (not shown).

The air passing from the filter 13 then encounters the liquid spray issuing from the banks of spray nozzles 25. The action of the liquid spray on the air stream is dependent upon its temperature and also upon the condition of the gas or air stream passed through the air washer. Depending upon the condition of the liquid and the air stream, the air stream may be humidified or dehumidified by the liquid because of the intimate contact between the finely broken up particles or droplets of liquid. There may also be a heat exchange relationship between the air or gas and the liquid.

It will be appreciated that because of the velocity of the gas or air stream particles of liquid will be carried away from the area where the air washing or air treating function is performed. It is desirable not to discharge these particles into the treated area which in the case of an air conditioning system constitutes the spaces being air conditioned. To intercept the liquid particles the previously mentioned eliminator blades 29 and 30 are provided.

Referring to FIGURE 3 liquid particles initially encounter the passages 60, 61 and 62 and because of the angular orientation of the planar members 40 a substantial portion of the droplets will impinge on the surface and drain to the slanted bottom portion 34 of the air washer and return to the sump. To be assured of reasonably good eliminating action by the blades 29 the members 40 have included therein tabs 42 which form channels 43 so that the directional component of force on the droplets which impinge will not cause the droplets to pass from the angular planar surfaces but rather these droplets will be collected in the channels.

It has been found that this preliminary eliminator blade construction 29 is capable of removing the coarse particles of liquid from the air stream. The air stream with fine particles then passes across the separating space 63 to the area which defines the fine eliminator blade construction which as previously mentioned comprises a first planar surface 45 having a porous and also a resilient surface preferably fabricated of urethane foam. The surface of the planar member 45 facing the air stream will have an opportunity to engage the fine liquid particles in the air stream and because of the porous nature of the foam these droplets will penetrate the surface and thereafter be substantially removed from the air stream. Additionally, to prevent the splattering of the droplet, as encountered in the prior art, this surface has a resilient quality to assure that the occurrence of splattering is minimized. Further to facilitate drainage of the liquid channels or grooves 53 are formed in the foam so that the liquid may drain freely while sheltered to a great extent from the air stream, permitting removal of the liquid from the eliminator structure area.

In accordance with prior art practices the eliminator structure has a bend and a second planar member is exposed to the air stream. This second planar member 46 is similarly provided with a foam coating and the vertically extending grooves 53. Because the air changes direction the momentum of the liquid droplets will cause a substantial portion of the droplets to impinge on the foam on the second planar member 46. It will be noted that optically dense paths are created through the eliminator section containing blades 30 since any straight line drawn from any point between the leading portions 51 through blades 30 to any point between the trailing portions 52 must intersect at least one of the planar surfaces 45 or 46.

This substantially reduces the droplets in the air stream. The trailing planar member 47 with its foam covering provides an additional porous and resilient structure for liquid flow from the eliminator blade area while sheltering the liquid which has been captured by the porous surface.

While there has been shown in FIGURE 3 a preferred embodiment of the eliminator blade construction it will be appreciated that other configurations may also be utilized. For example, the coarse blades may be dispensed with. If desired, the coarse blade structure may be integrated into the fine blade structure, depending upon the environment in which the eliminator is being used. Another aspect resides in the fact that the structure in FIGURE 3 may possibly be used without the grooves or channels 53 and further the use of a porous surface may be limited to a portion of the eliminator structure only.

It will be appreciated also that the present invention has broader aspects in that the elasticity of the foam may be substantially limited so that only the porosity of the foam may be utilized in the eliminator function. This suggests that other non-resilient materials may be utilized to provide an improved eliminating function. Also in some environments the porosity of the material is not as important as the resilient nature of the surface. The resilience discourages the formation of splatters when the droplets impinge on the eliminator blades. In this event the deflection of the blade surface will cause the material to adhere without returning into the air stream.

What is claimed as new and desired to be secured by Letters Patent of the United States is:

1. In an apparatus for treating a gas stream with a liquid the combination of means for propelling the gas stream at a high velocity, means for placing substantial quantities of liquid into intimate contact with the gas stream to condition the gas stream and an eliminator for removing liquid particles from the gas stream, said eliminator comprising impingement means including vertically extending wall portions angularly disposed with respect to the gas stream which partially remove liquid particles from the gas stream, a plurality of substantially vertical wall members being located downstream from the impingement means, said wall members including a first planar member and a second planar member angularly disposed with respect to the first planar member, and both being angularly disposed to the direction of flow of the gas stream, said planar members defining a plurality of substantially parallel optically dense paths having a general zig-zag configuration so that liquid particles in the gas stream passing through the zig-zag paths impinge on the planar members, said planar members having a coating of resilient and porous foam material and a plurality of vertically disposed, spaced, recessed grooves being formed in the coating said grooves extending substantially the entire height of said planar members.

2. The apparatus according to claim 1 wherein the wall members further comprise a third planar member having the coating, said third planar member being disposed in the general direction of the gas stream flow and downstream from the second planar member.

3. The apparatus according to claim 2 wherein the impingement means comprises a plurality of parallel vertically extending planar members angularly disposed with respect to the direction of gas stream flow and being spaced from the wall members, said last mentioned planar members having tab portions which define vertically extending channels along the trailing ends of the planar members.

References Cited

UNITED STATES PATENTS

| | | | |
|---|---|---|---|
| 735,193 | 8/1903 | Allert | 55—343 |
| 960,374 | 6/1910 | Muchka | 55—440 X |
| 1,364,141 | 1/1921 | Reams | 239—523 |
| 1,743,675 | 1/1930 | Jordahl | 55—443 |
| 1,771,846 | 7/1930 | Goodloe | 55—230 |
| 1,928,700 | 10/1933 | Sillers | 55—440 X |
| 2,226,128 | 12/1940 | Harmon | 55—230 |
| 2,703,228 | 3/1955 | Fleisher | 55—257 X |
| 2,878,892 | 3/1959 | Field | 55—242 X |
| 2,911,011 | 11/1959 | Niehart | 55—257 X |
| 2,997,131 | 8/1961 | Fisher | 55—466 |
| 3,159,471 | 12/1964 | Revell | 55—230 X |
| 3,164,456 | 1/1965 | Brainerd et al. | 55—500 |
| 3,190,057 | 6/1965 | Sinex | 55—313 |
| 3,208,204 | 9/1965 | Persson | 55—443 |
| 3,304,696 | 2/1967 | McKenna | 55—268 |

FOREIGN PATENTS

| | | |
|---|---|---|
| 1,361,634 | 4/1964 | France. |
| 551,685 | 6/1933 | Germany. |
| 134,873 | 11/1919 | Great Britain. |

HARRY B. THORNTON, *Primary Examiner.*

DENNIS E. TALBERT, *Assistant Examiner.*

U.S. Cl. X.R.

55—223, 230, 233, 242, 440, 443, 464, 524, 521; 261—100, 117